United States Patent [19]
Wynn et al.

[11] 3,923,176
[45] Dec. 2, 1975

[54] FIRST TABLE FOR A BALE WAGON

[75] Inventors: Edward J. Wynn, Fresno; Lee D. Butler, Kingsburg, both of Calif.

[73] Assignee: Sperry Rand Corporation, New Holland, Pa.

[22] Filed: Aug. 19, 1974

[21] Appl. No.: 498,782

[52] U.S. Cl.................. 214/518; 214/1 Q; 214/6 B
[51] Int. Cl.²...................... B60P 1/44; A01D 87/12
[58] Field of Search.......... 214/6 B, 6 P, 1 Q, 1 QA, 214/518, 519

[56] References Cited
UNITED STATES PATENTS

| | | | |
|---|---|---|---|
| 3,497,085 | 2/1970 | Jay et al. | 214/6 B |
| 3,501,025 | 3/1970 | Jay et al. | 214/6 B |
| 3,599,806 | 8/1971 | Fishcher | 214/6 B |
| 3,687,302 | 8/1972 | Castro | 214/6 B |

*Primary Examiner*—Robert J. Spar
*Assistant Examiner*—Leslie J. Paperner
*Attorney, Agent, or Firm*—John R. Flanagan; Frank A. Seemar; Joseph A. Brown

[57] ABSTRACT

An improved first, bale-receiving table mounted on a bale wagon is selectively operable in either one of two modes for moving a bale (or bales) upwardly to respectively deposit the bale on either one of two adjacent longitudinal edge side of flat side orientations on a second, tier-forming table of the bale wagon. Two embodiments or species of the improved first table are disclosed, both of which operate in a first one of the two modes to lift the bale, initially resting on its flat side, upwardly through an approximate 90° arcuate path and deposit the bale on its edge side on the second table and in a second one of the two modes to initially lift the bale upwardly at its longitudinal portion located near the second table and thereby dispose the bale in a tilted position with its lower flat side directed upwardly toward the second table and then to push the tilted bale upwardly toward the second table and deposit it on the second table on its lower flat side.

14 Claims, 13 Drawing Figures

FIRST TABLE FOR A BALE WAGON

CROSS REFERENCES TO RELATED APPLICATIONS

Reference is hereby made to the following co-pending U.S. applications dealing with related subject matter and assigned to the assignee of the present invention:

1. "Mode of Operation Selection for the First Table of a Bale Wagon" by Lee D. Butler et al, U.S. Ser. No. 498,833, filed Aug. 19, 1974.
2. "Load Position Sensing and Tier Pattern Selection for a Bale Wagon" by Lee D. Butler et al, U.S. Ser. No. 498,834, filed Aug. 19, 1974.
3. "Tier Pattern Selection and Formation for a Bale Wagon" by James A. Olsen et al, U.S. Ser. No. 498,839, filed Aug. 19, 1974.

BACKGROUND OF THE INVENTION

1. Field of the Invention

The present invention relates generally to the art of forming a stack of crop material bales and, more particularly, is concerned with an improved receiving table on a bale wagon being selectively operable in either one of two modes for moving bales upwardly and depositing them in either one of two adjacent longitudinal side orientations on a bale-supporting area of the bale wagon, such as the area defined by a tierforming table of the bale wagon.

2. Description of the Prior Art

It is accepted present day practice to form bales of crop material such as hay or the like into stacks through the employment of an automatic bale wagon.

One type of bale wagon which has achieved widespread commercial acceptance is the automatic bale wagon which employs the three table concept, as originally illustrated and described in U.S. Pat. No. 2,848,172 which issued to Gordon E. Grey.

The Grey bale wagon includes a first table which successively receives bales from a bale loader or pickup on the wagon and accumulates a predetermined number of them, for example two, being arranged end-to-end in a row, a second table which successively receives the accumulated rows of bales from the first table and accumulates a plurality thereof, such as four, five or six rows, which plurality of rows is commonly called a tier of bales, and a third table or load bed which successively receives the tiers from the second table and accumulates a plurality of the tiers, for example seven, to form a stack thereon. Once the stack has been accumulated on the load bed, it may be unloaded by pivoting the load bed 90° and depositing the stack on the ground or the like with the first tier of bales which was previously accumulated on the second table now being the lowermost tier of the stack in contact with the ground surface.

Since the stack formed by the bale wagon and deposited on the ground at a storage location may remain there for an extended period of time, it is desirable that the bales forming the lowermost tier be oriented such that a non-twine or -wire bearing side of each bale, commonly referred to as an "edge" side of a bale, is in contact with the ground in order to avoid wire rusting or twine rotting which eventually would result in broken bales in the lowermost tier and probable toppling of the stack.

To provide the aforementioned desired orientation of the bales of the lowermost tier of the stack, the operations which have heretofore been performed in picking up and forming bales into each of the tiers of the stack by the bale wagon are as follows. First, bales deposited on one of their edge sides in a field by a baler are picked up by the bale wagon loader and moved through a 90° lateral path to the first table where they are supported on one of their twine or wire bearing sides, commonly referred to as a flat side of the bale. Then, the first table is pivotally moved so as to lift and revolve the bales approximately 90° and deposit them on the second table of the wagon in the same desired edge side orientation as they will appear when subsequently transferred in stack form by the load bed of the wagon to the ground.

In order to enhance the stability of the stack, it is generally desirable to provide one or more tie tiers within the stack, such being tiers having individual bales arranged to overlap two bales in adjacent tiers above and below the tie tier. Formation of one or more tie tiers can be accomplished during formation of the stack on the bale wagon, for example, through utilization of mechanism which is similar to that illustrated and described in U.S. Pat. No. 3,395,814 and has been incorporated into several present day commercial models of the Grey bale wagon.

Overall, the stacks of bales formed by these current models of the Grey bale wagon, wherein all of the bales are oriented on their edge sides, have satisfactory stability.

However, with respect to stacks which must conform to certain legal width restrictions in order for transport on public highways by trucks and are formed of bales having certain size dimensions, it has been found more desirable to orient the bales of all of the tiers of the stacks, including the tie tiers, but excluding the lowermost tier, on their flat sides. For example, in the case of bales having the approximate size dimensions of 16 inches (edge side width) × 23 inches (flat side width) × 46 inches (length), being most prevalent in the southwestern region of the U.S., bales oriented on their flat (23 inches wide) sides each cover a surface area having a length approximately twice that of its width and thus may be formed by some current Grey bale wagon models into compact, square tie tier patterns utilizing a tie mechanism similar to that disclosed in the aforementioned U.S. Pat. No. 3,395,814, as well as a compact and square standard tier pattern, if such current models were adapted to pick up bales lying on their flat sides in the field. Standard and tie tiers having such a compact and square configuration would form a block-type stack which conforms to the legal width and tier pattern restrictions for public highway transportation.

Although current models of the Grey bale wagon utilizing the aforementioned tie mechanism could readily be adapted, by widening their bale loader, to pick up bales placed on their flat sides on the field by a baler, as opposed to the prevailing, more desirable, practice of depositing bales on their edge sides in the field, and build a stack in which all bales of the standard and tie tier patterns would be oriented on their flat sides after the stack is unloaded upright from the bale wagon, the advantage described hereinbefore associated with orienting the bales of the lowermost tier on their edge sides would not be retained since the first table and its standard mode of operation as heretofore provided on all models of the Grey bale wagon up to the present

SUMMARY OF THE INVENTION

The present invention overcomes the above-described disadvantages of the first table as heretofore provided on all models of the Grey bale wagon by providing improved structure for the bale-receiving table which, in substance, retains the general form and single mode of operation of the first table as known heretofore and supplements its capabilities by allowing it to be selectively modified to operate in another mode.

Thus, in the formation of one preferred stack pattern of the block-type stack on a bale wagon incorporating the improved first table, by selected operation of the improved first table of the present invention in one mode, the bales for forming the first lowermost tier of the stack, such as a standard tier, may be successively moved upwardly and deposited on the second table on one of their edge sides, and, in the other mode, the bales for forming the remaining tiers of the stack, such as a predetermined sequence of standard and tie tiers, may be successively moved upwardly and deposited on the second table on one of their flat sides.

While the improved first table of the present invention is particularly adapted for facilitating the formation of the aforementioned preferred pattern of the block-type stack on a bale wagon, as well as other patterns of block-type stacks, it is readily apparent that the improved first table may be incorporated into bale wagons for forming other types of stacks in situations where it is desired to position bales of some of the tiers of such other stacks on their edge sides and bales of other tiers on their flat sides.

Accordingly, the present invention broadly comprises, in a bale wagon having a mobile chassis and means mounted on the chassis defining a bale-supporting area, an improved means mounted on the chassis for receiving at least one bale on a first one of its sides adjacently along and generally below the bale-supporting area, the improved bale-receiving means being selectively operable in either one of two modes for moving the bale upwardly to respectively deposit the bale on the first one of its sides, or a second one of its sides adjacent to the first one side, on the bale-supporting area.

More particularly, two embodiments of the present invention are provided.

A first embodiment of the bale-receiving means, comprising the preferred form of the present invention, includes first structure for supporting the bale along its first side at a location remote from the bale-supporting area and second structure for supporting the bale along its first side at a location near the bale-supporting area, with the first and second structures being operable in either one of the two modes for upward movement of the bale. The first and second structures are independently mounted to the chassis for pivotal movement between lower and upper positions toward and away from the bale-supporting area. Still further, the bale-receiving means includes means for selectively operating the first and second structures in either one of their two modes. Such selective operating means includes a first actuatable driving component pivotally coupled between the chassis and the first structure for pivotally moving the first structure from its lower to its upper position, a second actuatable driving component pivotally coupled between the chassis and the second structure for pivotally moving the second structure from its lower to its upper position, and means for actuating the first and second driving components so as to operate the first and second structures in either one of their two modes.

A second embodiment of the bale-receiving means, comprising an alternative form of the present invention, includes first structure for supporting the bale along its first side and second structure for supporting the first structure, with the first and second structures being operable in either one of the two modes for upward movement of the bale. The first structure is mounted to the second structure for pivotal movement between lower and upper positions toward and away from the bale-supporting area. The second structure is mounted to the chassis for pivotal movement between lower and upper positions toward and away from the bale-supporting area. Further, more particularly, the bale-receiving means includes means for selectively operating the first and second structures in either one of the two modes. Such selective operating means includes a first actuatable driving component pivotally coupled between the first structure and the second structure for maintaining the first structure in a fixed relationship to the second structure in a first one of the two operative modes and for pivotally moving the first structure relative to the second structure and between its lower and upper positions in a second one of the two operative modes. The selective operating means further includes a second actuatable driving component pivotally coupled between the chassis and the second structure for pivotally moving the second structure from its lower to its upper position in the first one of the two operating modes and for pivotally moving the second structure to, and holding it at, an intermediate position between its lower and upper positions in the second one of the two operating modes. Additionally, the selective operating means includes means for actuating the first and second driving components so as to operate the first and second structures in either one of the two modes.

Both embodiments or species of the improved bale-receiving means operate in a first one of the two modes to lift the bale, initially resting on the first one of its sides, upwardly through an approximate 90 degree arcuate path and deposit the bale on its second one side on the bale-supporting area and in a second one of the two modes to initially lift the bale upwardly at its longitudinal portion located near the bale- supporting area and thereby dispose the bale in a tilted position with its first one side directed upwardly toward the bale-supporting area and then to push the tilted bale upwardly toward the bale-supporting area and deposit it on its first one side on the bale-supporting area. Also, means for engaging the bale as it is lifted to its tilted position by operation of either of the embodiments of the improved bale-receiving means in the second mode are provided on the mobile chassis of the wagon along a side of the bale-receiving means located remote from the bale-supporting area to limit movement of the bale away from the bale-supporting area.

The aforementioned two embodiments of the improved bale-receiving means for the bale wagon, comprising the present invention, constitute one of several improved features incorporated in a bale wagon for forming the aforementioned preferred pattern and other patterns of the block-type stack of bales. The other of the several features comprise the subject matters of other co-pending applications, cross-referenced above, and need not be illustrated and described herein for a complete and thorough understanding of the present invention.

Other advantages and attainments of the present invention will become apparent to those skilled in the art upon a reading of the following detailed description when taken in conjunction with the drawings in which there is shown and described the two illustrative embodiments of the invention.

BRIEF DESCRIPTION OF THE DRAWINGS

In the course of the following detailed description reference will be frequently made to the attached drawings in which.

DETAILED DESCRIPTION OF THE INVENTION

In the following description, right hand and left hand references are determined by standing at the rear of the machine and facing in the direction of forward travel. Also, in the following description, it is to be understood that such terms as "forward," "left," "upwardly," etc., are words of convenience and are not to be construed as limiting terms.

IN GENERAL

Figures 1, 2:
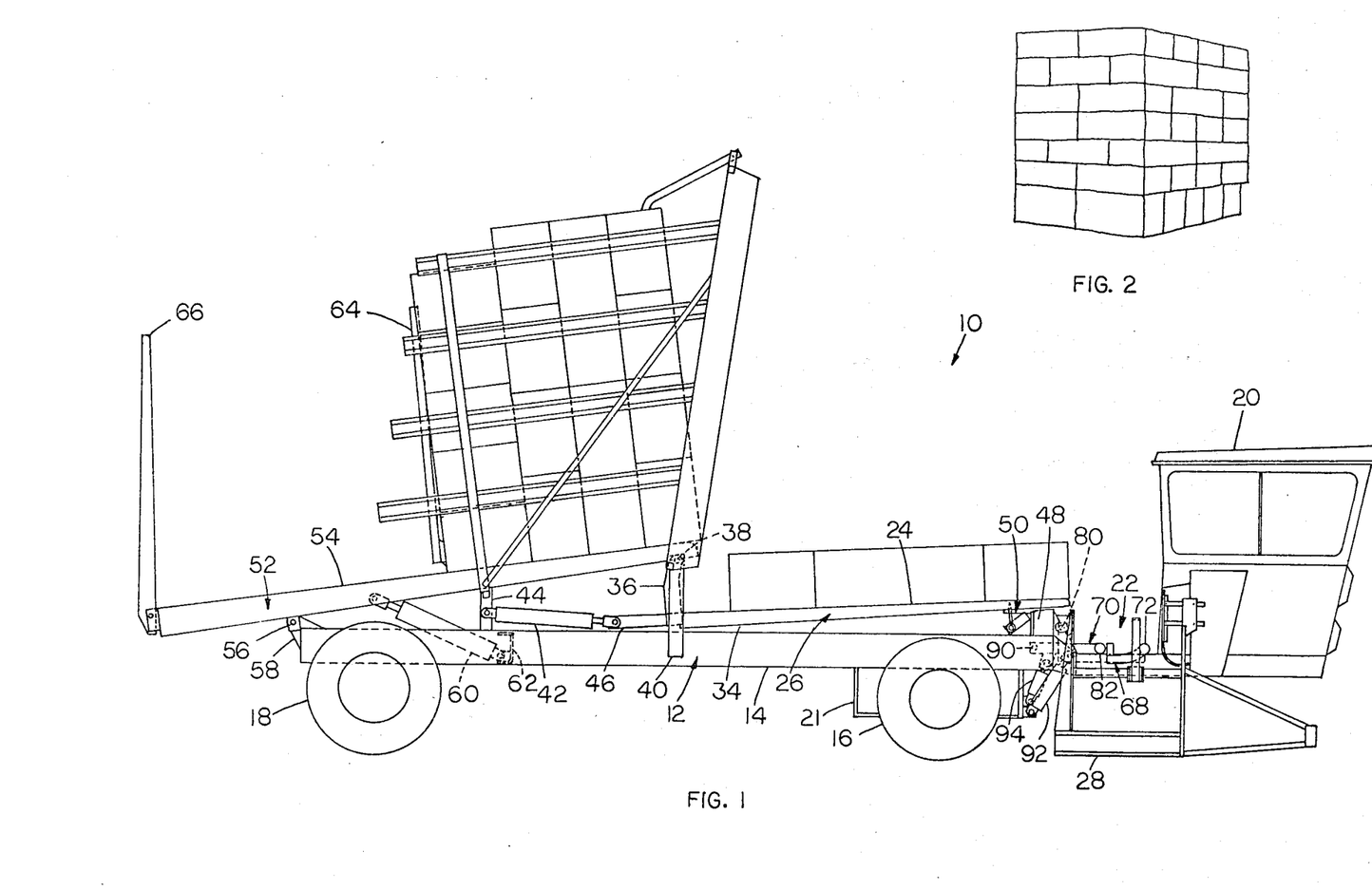
FIG. 1 is a side elevational view of a bale wagon embodying the principles of the present invention, showing the bale wagon with a partially formed block-type stack of bales on its load bed and during formation of a tier of bales on its second tier-forming table.
FIG. 2 is a perspective view of the standing block-type stack on a smaller scale than that of FIG. 1, showing the stack after it has been deposited upright on the ground or the like by the bale wagon of FIG. 1, with the bales of lowermost tier resting on one of their edge sides and the bales of the remaining tiers resting on one of their flat sides.

Referring now to the drawings, and particularly to FIG. 1, there is shown a bale wagon, being indicated generally by the numeral 10, for forming a block-type, tied or interlocked stack of bales, as shown in FIG. 2, which wagon 10 incorporates the preferred embodiment of the improved means for a bale wagon comprising the present invention.

The bale wagon 10 is provided with a mobile chassis, indicated generally at 12, formed of left and right longitudinally extending channels 14 (only the right channel being shown), suitably interconnected by spaced transverse channels (not shown), and front and rear pairs of wheels 16, 18, only the right front and rear wheels of each pair being shown in FIG. 1, for movably supporting the interconnected channels 14. On the forward ends of the channels 14 is mounted a cab 20 for housing the operator and various controls for the wagon. A source of power, such as an engine (not shown) is suitably mounted on the chassis 12 within a support structure 21 fixed between channels 14 for driving, preferably, the rear pair of wheels 18. Although the wagon illustrated is a self-propelled type, it could readily take the form of a pull-type wagon with the forward ends of the channels 14, instead of mounting the cab, 20, converging in an assembly which would adapt the wagon to be secured to a tractor, or other towing vehicle, located at the front of the wagon.

Mounted near the forward end of the mobile chassis 12, immediately rearwardly of the cab 20, and extending transversely thereto is the preferred form of means for receiving bales, generally indicated by the numeral 22, comprising the improvement provided by the present invention and hereinafter referred to as the improved first, bale-receiving table of the wagon 10. The first table 22 is positioned adjacently along and generally below a bale-supporting area, generally designated 24, defined by means hereinafter referred to as the second, tier-forming table of the wagon 10, generally indicated by the numeral 26.

The improved first table 22 is selectively operable in either one of two modes to lift the bales received thereon on their flat sides upwardly and deposit the bales on the bale-supporting area 24 on either one of the edge or flat sides of the bales. The improved construction of the first table 22 and the components for operating it in either one of its two modes will be described in greater detail hereinafter.

It will be understood by those skilled in the art, that the bales are first introduced to the first table 22 by means of a bale loader or pickup, generally indicated at 28, which is mounted to the chassis 12 at the right end of the table 22 and operative to lift bales, resting on one of their edge sides, from the ground and direct them through a generally 90° arcuate lateral path to the right receiving end of the table 22. The loader 28 is generally similar to the one illustrated and described in U.S. Pat. No. 2,848,127 and need not be illustrated and described in detail herein for a thorough and clear understanding of the present invention.

Also, it will be understood by those skilled in the art, that a cross conveyor 30 (FIGS. 5 and 7) is operatively mounted to the chassis 12 and longitudinally extends along and above certain spaced structural portions of the first table 22 from approximately the right receiving end to near the middle thereof for moving the bales laterally from the loader 28 toward the left end of the first table 22. The cross conveyor 30 is generally similar to the one illustrated and described in the aforementioned U.S. patent and need not be illustrated and described in detail herein for a thorough and clear understanding of the present invention.

The second, tier-forming table 26 is formed by an L-shaped structure having a forwardly extending leg portion 34 across which is defined the area 24 which provides a surface upon which bales are supported and formed into a tier and an upwardly extending rear leg portion 36 which is pivotally secured at 38 between spaced apart upstanding brackets 40, only the right one being shown in FIG. 1, mounted on the longitudinal channels 14. A hydraulic cylinder 42 is pivotally secured at its anchor end to a frame member 44 mounted between the longitudinal channels 14. The rod end of the hydraulic cylinder 42 is pivotally secured to the free end of an arm portion 46 which is fixedly secured to, and extends rearwardly from, the L-shaped structure of the second table 26.

When the second table 26 is in its normal horizontal tier- forming position, as shown in FIG. 1, it rests at its forward end on a transverse support member, not shown, fixed to front brackets 48, only the right one being seen in FIG. 1. When the requisite number of bales have been accumulated and formed on the second table 26 in a suitable manner into either a standard tier pattern, or one of several tie tier patterns through utilization of a tie spike mechanism 50, being similar to that disclosed in aforementioned U.S. Pat. No. 3,395,814, mounted to the transverse support member and positioned below the second table 26, the hydraulic cylinder 42 is actuated by suitable trip means (not shown) via suitable hydraulic controls so that it extends and causes the table 26 to swing or pivot upwardly generally 90 degrees about its pivot point 38 to a generally vertical position adjacent the front end of a rearwardly disposed load bed, or third load table, being generally indicated by the numeral 52. In this manner, the tier of bales formed on the second table 26 is transferred to the load bed 52.

The tie spike mechanism 50 and other means for forming one of the aforementioned types of tier patterns on the second table 26 is the subject matter of co-pending patent application, U.S. Ser. No. 498,839, filed concurrently herewith and cross-referenced above, directed to other improved features of the bale wagon 10 and need not be illustrated and described herein for a thorough and clear understanding of the present invention.

The load-carrying bed 52 includes a platform assembly 54 which is pivotally mounted at 56 between spaced apart upstanding rear brackets 58, only the right one being shown in FIG. 1, mounted on the longitudinal channels 14. A pair of spaced apart hydraulic cylinders 60, only the right one being shown, are pivotally secured at their anchor ends to transverse frame member 62 being fixed between channels 14 and at their rod ends to the platform assembly 54. When the load bed 52 is in its normal, generally horizontal tier-receiving position, as shown in FIG. 1, it rests at its forward end on upstanding brackets 40. A stack of bales is progressively formed on the load bed 52 upon successive delivery thereto of tiers of bales by pivotal movement of the second table 26 from its normal horizontal tier-forming position of FIG. 1 to its generally upright position adjacent the forward end of the load bed 52.

As the first tier of bales is delivered or deposited onto the load bed 52, a rolling rack for supporting the rear of the load being formed on the load bed 52, being generally indicated by the numeral 64 and longitudinally movable rearwardly along the load bed by the load being formed and forward by a hydraulic cylinder (not shown), is contacted by the tier and forced to move rearwardly along the load bed 52 against the residual holding pressure of the hydraulic cylinder. It will be understood by those skilled in the art, that while the rolling rack 64 is held by hydraulic pressure at the position to which it has been moved along the load bed 52, the pressure of the rolling rack cylinder is overcome with the delivery of each successive tier of bales from the second table 26 to the front end of the load bed 52 whereby the rolling rack 64 is forced to move rearwardly one bale width until the rack 64 reaches a generally rearmost position along the load bed 52, depending upon the desired number of tiers forming the stack, whereupon a complete stack has been formed on the load bed 52.

The structure and function of the rolling rack 64 forms no part of the present invention and need not be illustrated and described in detail herein for a thorough and clear understanding of the present invention. Certain details of the rolling rack and the role it plays in the manner of selecting which of the several tier patterns will be formed on the second table is the subject matter of co-pending patent application U.S. Ser. No. 498,834, filed concurrently herewith and cross-referenced hereinbefore.

When the load bed 52 has been loaded with the desired number of tiers, the stack can be transferred to the ground in the form of a composite stack by extension of the hydraulic cylinders 60 which cause the load bed 52 to pivot generally 90 degrees about point 56 from its generally horizontal position of FIG. 1 to an upright position in which the rolling rack 64 and the rear end of the load bed 52 which mounts additional upright supporttines 66 are disposed adjacent the ground.

PREFERRED FORM OF THE IMPROVED FIRST TABLE

Figure 3:
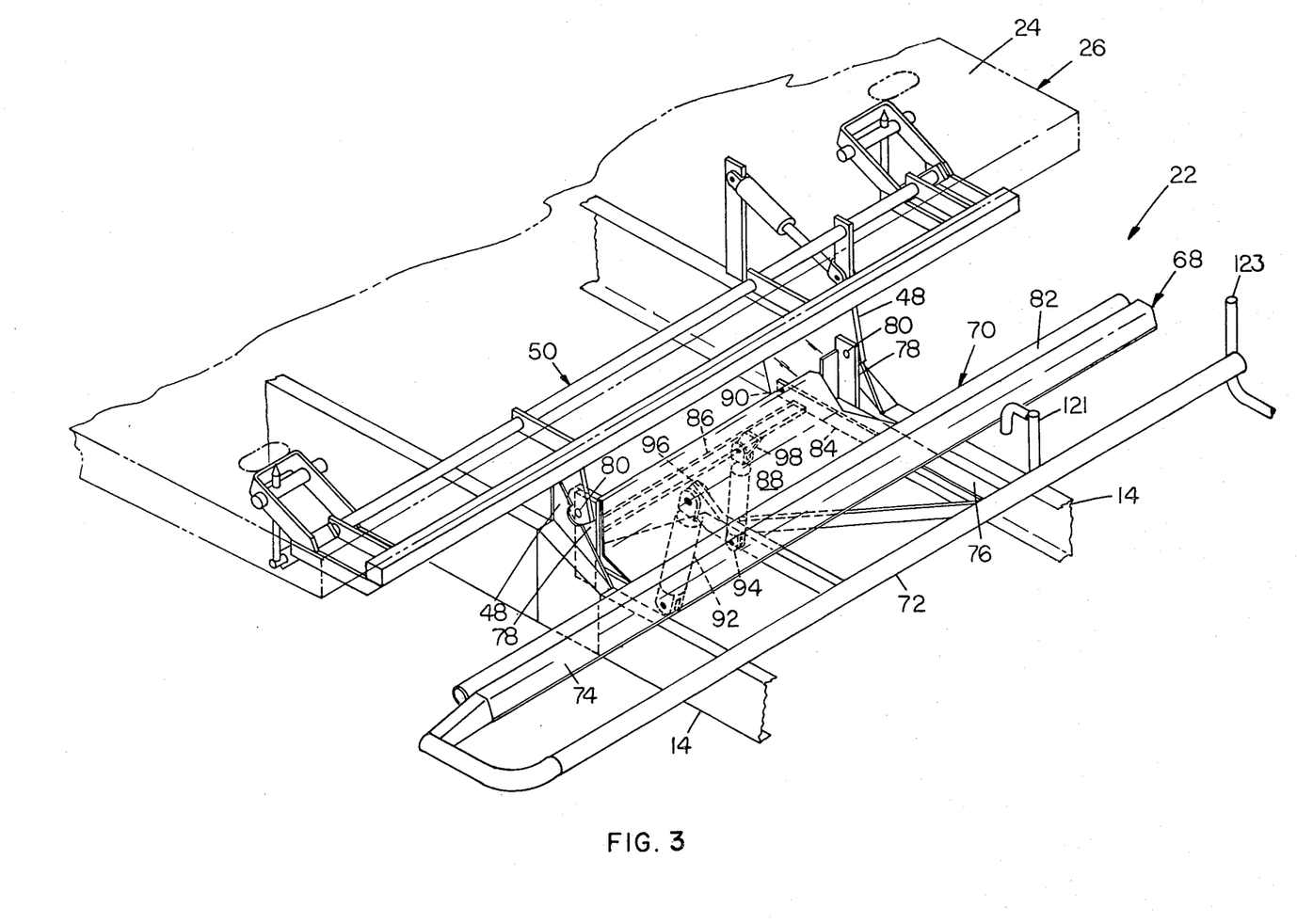
FIG. 3 is an enlarged perspective view of the front portion of the bale wagon of FIG. 1 which portion is located immediately rearwardly of the wagon cab, showing the preferred form of the bale-receiving means, the front portion of the second tier-forming table in phantom, a tie spike mechanism associated with the front second table portion, and the outer and inner trip levers for the bale-receiving means.

The preferred form of the improved first table 22 is illustrated in detail in FIG. 3 and generally includes first and second structures, generally designated 68 and 70 respectively.

Figures 4, 5, 6, 7, 8:
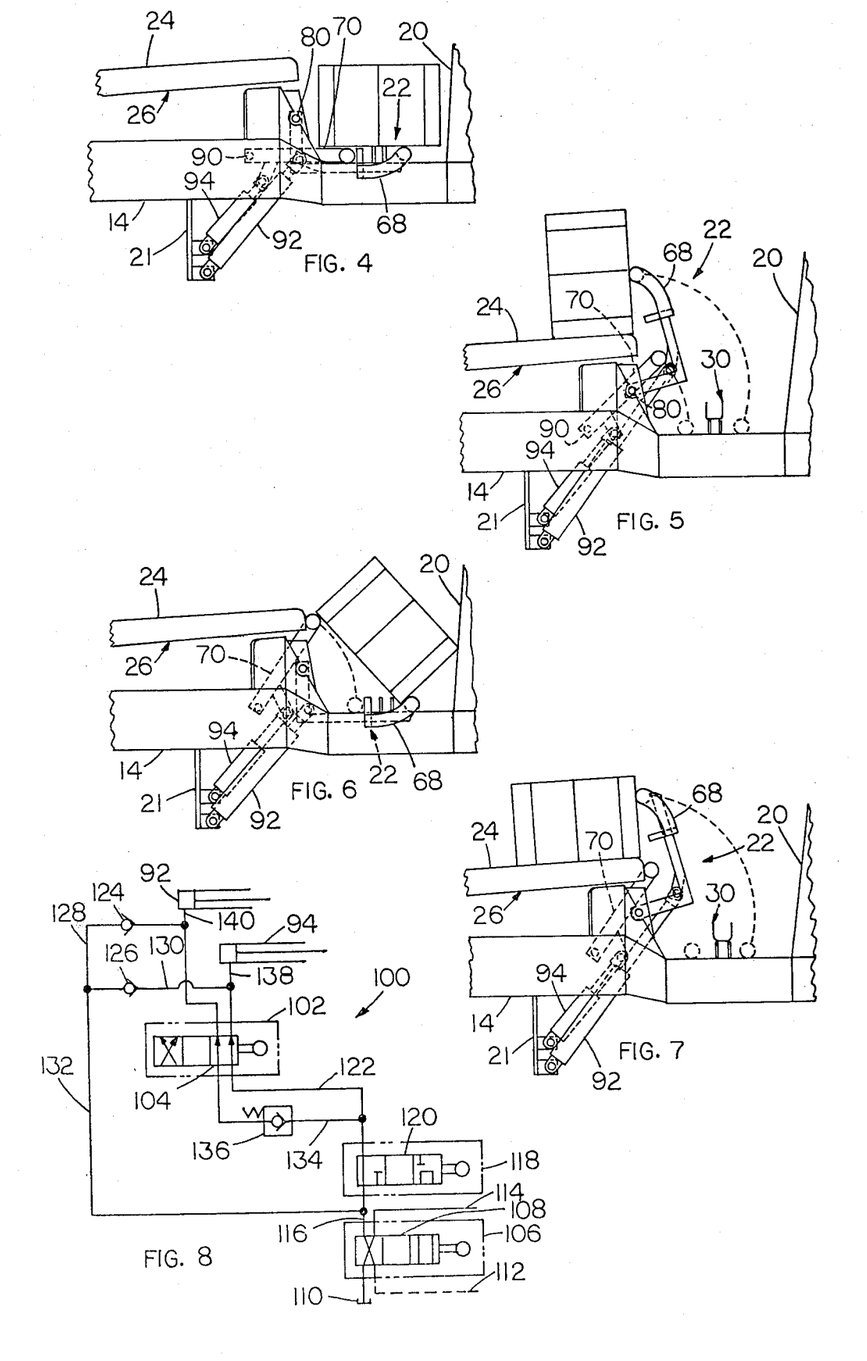
FIGS. 4 and 5 are schematic representations of at least one bale being delivered by the bale-receiving means of FIG. 3 on its edge side onto the front portion of the second table.
FIGS. 6 and 7 are schematic representations of the bale being delivered by the bale-receiving means of FIG. 3 on its flat side onto the front portion of the second table.
FIG. 8 is a schematic representation of the hydraulic circuit associated with the hydraulic cylinders for driving the bale-receiving means.

The first structure 68 of the table 22, generally similar to the construction of the first table on the Grey bale wagon as known heretofore, is comprised by two transversely-extending and spaced apart, front and rear beams 72, 74 which are mounted on a forwardly extending horizontal portion 76 of an L-shaped structure which also includes rear upwardly extending leg portions 78 which are pivotally secured at 80 between the spaced-apart upstanding front brackets 48 being mounted on the longitudinal channels 14. The front transverse beam 72 of the first structure 68 will support the bale (or bales) received on the first table 22 along one flat side of the bale at a location remote from the bale supporting area 24 of the second table, as seen in FIGS. 1 and 4. While the rear transverse beam 74 will support the bale (or bales) received on the first table 22 along the one flat side of the bale at a location near the second table 26, also as seen in FIGS. 1 and 4, the presence of the latter rear beam 74 is not essential for satisfactory operation of the improved first table 22 since the second structure 70, which will be described hereinafter, includes means for supporting the bale (or bales) at substantially the same location. The rear beam 74 is retained in the improved first table 22 only to enhance the structural integrity or strength of the first structure 68. The fact that it takes the shape or form as it appeared heretofore in the first table of the Grey bale wagon is a matter of expediency since other members having different constructions could be utilized to provide the necessary strength for the first structure 68.

The second structure 70 of the improved first table 22 was not heretofore present in the first table of the Grey bale wagon. Structure 70 is comprised by a transverse pipe 82 mounted on the forward ends of a pair of spaced-apart arms 84 being interconnected by a brace 86. The pipe 82 constitutes the aforementioned means of the second structure 70 which supports the bale (or bales) received on the first table 22 along the one flat side of the bale at the location near the second table, as seen in FIGS. 1 and 4. The rear ends of the arms 84 are pivotally secured at 90 between the upstanding brackets 48 generally below, inwardly from, and rearwardly of, the pivotal securement of the first structure 68 at 80 to the brackets 48. A shield piece 88 is fixed across the arms 84 rearwardly of the pipe 82 for helping to prevent the flow of hay chaff from the bales received on the first table 22 to under the front end of the second table 26 where the engine for the bale wagon 10 is preferably located on support structure 21.

the preferred form of the improved first table 22 further includes means for selectively operating the first and second structures 68, 70 in either one of two modes for moving the bale (or bales) upwardly to respectively deposit the bale on its edge side or flat side on the bale- supporting area 24 of the second table 26.

The means for selectively operating structures 68, 70 of the first table 22 includes first and second actuatable driving components being in the form of first and second hydraulic cylinders 92, 94.

The first hydraulic cylinder 92 is pivotally secured at its anchor end to the forward side of the engine support structure 21. Its rod end is pivotally secured to the free end of an arm 96 which is fixedly secured to, and extends rearwardly and upwardly from, the L-shaped structure of the first structure 68 of the first table 22. The first structure 68 normally rests in a generally horizontal, bale-receiving position, as shown in FIGS. 1, 4 and 6, with its beams 72, 74 upon the longitudinal channels 14. As the first hydraulic cylinder 92 is extended, the first structure 68 will swing or pivot approximately 90 degrees upwardly about its pivot point 80 in a counterclockwise direction to a generally vertical, bale-discharging position adjacent the second table 26, as seen in FIGS. 5 and 7.

The second hydraulic cylinder 94 is pivotally secured at its anchor end also to the forward side of the engine support structure 21. Its rod end is pivotally secured to the free end of an arm 98 which is fixedly secured to, and extends rearwardly and downwardly from, the brace 86 of the second structure 70 of the first table 22. The second structure 70 normally rests in a generally horizontal, bale-receiving position, as shown in FIGS. 1 and 4, with its transverse pipe 82 being positioned rearwardly of, and adjacent, the rear beam 74 of the first structure 68 and overlapping and being supported by the forwardly extending horizontal portion 76 of the L-shaped structure of the first structure 68. As the second hydraulic cylinder 94 is extended, the second structure 70 will swing or pivot approximately 60 degrees upwardly about its pivot point 90 in a counterclockwise direction to a generally forwardly-inclined position with its pipe 82 positioned adjacent the front edge of the second table 26, as seen in FIG. 6. Also, in view of the overlapping relationship of the pipe 82 of the second structure 70 with the first structure 68, the second structure 70, even when not positively driven by its second cylinder 92, will be carried to its upper position by the first structure, as is the case in FIG. 5, whenever the second structure 70 is initially resting at its horizontal position and only the first hydraulic cylinder 92 is actuated to pivot the first structure 68 to its upper, vertical position.

The means for selectively operating structures 68, 70 further includes hydraulic means, generally designated by numeral 100 in FIG. 8, for actuating the first and second hydraulic cylinders 92, 94 so as to operate the first and second structures 68, 70 of the improved first table 22 in either one of their two modes.

TWO MODES OF OPERATION OF IMPROVED FIRST TABLE

FIGS. 4 and 5 illustrate the respective positions of the structures 68, 70 comprising the improved first table 22, at the start and end of a first of the two modes of operation of the structures 68, 70. The first mode generally simulates the single mode of operation of the first table as heretofore provided on the Grey bale wagon and merely involved actuation (extension) of the first hydraulic cylinder 92. As has been explained hereinbefore, even though the second hydraulic cylinder 94 is not actuated during the first mode of operation of the first table 22, the second structure 70 is carried with the first structure 68 and pivoted from its lower to its inclined position. Accordingly, as in the case of the first table known heretofore, the operation of the improved first table 22 in the first mode lifts the bale resting on one of its flat sides through an approximately 90° path and deposits it on the area 24 of the second table 26 on an adjacent edge side of the bale.

FIGS. 4, 6 and 7 illustrate the respective positions of the structures 68, 70, comprising the improved first table 22, at the start, middle and end of a second of the two modes of operation of the first table structures 68, 70. In the second mode, initially the second hydraulic cylinder 94 is actuated (extended) and pivots the second structure 70 from its lower horizontal position of FIG. 4 toward its upper inclined position of FIG. 6. As the second structure 70 pivots, its pipe 82 lifts the longitudinal portion of the bale located adjacent the second table 26 upwardly which pivots the bale in a clockwise manner forwardly until its upper forward longitudinal corner contacts the rear side of the cab 20 (or contacts the rear side of a vertically disposed guide plate, not shown spaced rearwardly from, and mounted horizontally along, the rear side of the cab 20). The location of the rear side of cab 20 remote from the second table 26 and along the front beam 72 of first structure 68 limits movement of the tilted bale away from the second table 26. After contact of the bale with the cab 20, further pivoting of the second structure 70 to its upper position moves its pipe 82 relative to, and along, the flat side of the bale toward its rear lower longitudinal corner and to adjacent the front edge of the second table 26 and causes the bale to fulcrum about its upper forward longitudinal corner against the cab 20 and its lower forward longitudinal corner to drop rearwardly behind the front beam 72 of the first structure 68 which places the front beam 72 in contact with the forward edge side of the bale. It will be noted that after the middle position is reached, as shown in FIG. 6, the lower flat side of the bale is now tilted and aligned upwardly and rearwardly along a plane which extends above and past the front edge of the second table 26.

Once the second structure 70 has reached its upper position of FIG. 6, the first hydraulic cylinder 92 is actuated and pivots the first structure 68 from its lower horizontal position, as seen in FIGS. 4 and 6, toward its upper vertical position of FIG. 7. As the first structure 68 pivots, its front beam 72 pushes on the front edge side of the bale and thereby moves the bale upwardly along the aforementioned rearwardly inclined plane and onto the area 24 of the second table 26, whereby the bale is deposited on the second table 26 on its same flat side.

Referring now to FIG. 8, there is shown the hydraulic means 100 for selectively actuating the first and second hydraulic cylinders 92, 94 so as to selectively operate the structures 68, 70 of the improved first table 22 in either one of their above-described two modes.

The hydraulic means 100 includes a first table selector valve 102 having a spool 104 being movable between an out position in which it selects or allows actuation of the improved first table 22 in the first of its two modes and an in position, as shown in FIG. 8, in which it selects or allows actuation of the table 22 in the second of its two modes. The selector valve spool 104 may be moved between its in and out positions by any suitable arrangement, such as by appropriate movement of a control lever in the cab 20 by the bale wagon operator, which lever is connected to the valve spool 104 by suitable mechanical linkage.

The hydraulic means 100 further includes a first table valve 106 having a spool 108 being movable between an in position and an out position. When the spool 108 is at its in position, the first and second hydraulic cylinders 92, 94 are connected to the tank 110 and hydraulic fluid under pressure from a pump (not shown) via line 112 passes through the valve 106 and via line 114 flows to a hydraulic motor (not shown) for operating the cross conveyor 30. When the spool 108 is at its out position, as seen in FIG. 8, hydraulic fluid under pressure flows from line 112 through the valve 106 to line 116.

A first table delay valve 118 is also shown in association with the hydraulic means 100. The valve 118 has a spool 120 being movable between an out position, as seen in FIG. 8, in which fluid from line 116 passes through the valve 118 and therefrom to selector valve 102 via line 122, and an in position in which passage of fluid to the selector valve 102 (and thus to cylinders 92, 94) will be obstructed and thus the first table 22 will be prevented from actuation. Movement of the valve spool 120 to its in position may be controlled by a lever in the cab 20 or by automatic mechanical linkage which is responsive to either actuation of the second table 26 or movement of the bale loader 28 to its transport position in which it overlies the right end of the first table 22. Thus, the valve 118 performs the beneficial function of preventing damage through a collision between the first table 22 and the loader 28, but it does not represent an essential feature of the means 100 with respect to the present invention. Thus, for purpose of the present discussion, it will be assumed that the valve 118 remains in its out position interconnecting lines 116 and 122.

Whenever a desired number of bales have been received on the first table 22, a suitable first table trip mechanism, similar to that heretofore provided on some recent commercial models of the Grey bale wagon, is engaged and moved which, in turn, moves the spool 108 of the first table valve 106 to its out position of FIG. 8. When only one bale is intended to be delivered by the first table 22 to the second table 26, an intermediate trip arm 121 is pivoted, by activation of suitable control means (not shown), upwardly between the beams 72, 74 of the first structure 68 and into the path of bale movement along the first table 22. Thus, when a single bale is received and conveyed along the first table 22, it engages and moves the arm 121. The spool 108, being connected to the arm 121 by suitable linkage (not shown), is then moved to its out position. When a pair of bales are intended to be delivered by the first table 22 to the second table 26, the intermediate trip arm 121 is pivoted, by deactivation of its control means, downwardly out of the path of bale movement along the first table 22. Thus, when two bales are received and conveyed along the first table, the second bale pushes the first bale into engagement with an outer trip arm 123, normally positioned in the bale path near the left end of the first table 22, and moves the arm 123. The spool 108, being connected to the arm 123 by suitable linkage (not shown), is moved to its out position.

Movement of the spool 108 to its out position allows hydraulic fluid flow under pressure in line 122 via line 116. The presence of one-way check valves 124, 126 in branch lines 128, 130 of line 132 prevent flow in these lines from line 116 to the cylinders 92, 94. Also, a flow line 134 is provided interconnecting flow line 122 with one path in each of the two pairs of flow paths through the valve 102. A relief valve 136 is connected in the line 134 which will normally prevent the flow of fluid from line 122 in line 134 to the valve 102 until predetermined level of line pressure is reached. Such level is above the level of pressure needed to extend the second hydraulic cylinder 94. Thus, when the selector valve 102 is at its in position for operation of the first table 22 in its second mode to deposit the bales on their flat sides on the second table 26, the flow of fluid initially proceeds through valve 102 to the second cylinder 94 via line 138 to cause extension thereof, as seen in FIG. 6. Once the cylinder 94 has fully extended, a level of pressure is almost instantaneously reached which overcomes the spring bias of relief valve 136, whereby the flow of fluid proceeds in line 134 through valve 102 to the first cylinder 92 via line 140 to cause extension thereof, as seen in FIG. 7. When the cylinder 92 has fully extended with the first structure 68 pivoted to its upper vertical position, suitable mechanical linkage (not shown) such as has heretofore been provided on the Grey bale wagon, is tripped which moves the spool 108 of the first table valve 106 to its in position, allowing the first table to return to its lower position.

If the selector valve 102 had been at its out position for operation of the first table 22 in its first mode to deposit the bales on their edge sides on the second table 26, the flow of fluid would have proceeded from line 122 across through valve 102 to cylinder 92 via line 140 to cause extension thereof, as seen in FIG. 5. Once the cylinder 92 had fully extended with the first structure 68 pivoted to its upper vertical position (which also would carry second structure 70 to its upper position), the same aforementioned linkage would move the spool 108 of the first table valve 106 to its in position. Thus, the positive delivery of hydraulic fluid to the second cylinder 94 through relief valve 136 is not necessary in the operation of the first table 22 in its first mode.

Regardless of which mode of operation has just occurred, once the spool 108 of the first table valve 106 has moved to its in position, line 116 is connected through the valve 106 to the tank 110 and hydraulic fluid will return flow to the tank 110 via lines 140 to 128 to 132 to 116, via lines 138 to 130 to 132 to 116 and via lines 138 to 122 to 116.

ALTERNATIVE FORM OF THE IMPROVED FIRST TABLE

The alternative form of the improved first table, generally designated 142, is schematically illustrated in FIGS. 9 through 12 and generally includes first and second structures, generally designated 144 and 146 respectively.

The first structure 144 is comprised by three transversely- extending and spaced-apart beams, namely, front, middle and rear beams 148, 150, 152. The front and middle beams 148, 150 are mounted on a pair of forwardly-extending horizontal support members 154, only the right member being shown in FIGS. 9 through 12. The support members 154 are hingedly or pivotally secured at 156 to respective free ends of a pair of short forward horizontal portions 158 (only the right one being shown) of the second structure 146 which is L-shaped and also includes a pair of rear upwardly- extending leg portions 160 (only the right one being shown) which are pivotally secured at 162 between the spaced-apart upstanding front brackets 48 mounted on the longitudinal channels 14, as described hereinbefore. The rear beam 152 is mounted to the support members 154 by a pair of spaced braces 164 (only the right one shown) which extend rearwardly therefrom between the short horizontal portions 158 of the second structure 146. Thus, the rear beam 152 is located rwarwardly of the hinge or pivot point 156 of the first structure 144 to the second structure 146, while the middle and front beams 148, 152 are both located forwardly therefrom.

It is readily apparent that the beams 148, 150, 152 of the first structure 144 will support the bale (or bales) received on the first table 142 along one flat side of the bale, while the second structure 146 will support the first structure 144.

The alternative form of the improved first table 142 further includes means for selectively operating the first and second structures 144, 146 in either one of two modes for moving the bale upwardly to respectively deposit the bale on its edge side or flat side on the bale- supporting area 24 of the second table 26.

The means for selectively operating structures 144, 146 of the first table 142 includes first and second actuatable driving components being in the form of first and second hydraulic cylinders 166, 168.

The first hydraulic cylinder 166 is pivotally secured at its anchor end to an arm 167 which extends rearwardly and upwardly from the second structure 146. Its rod end is pivotally secured to an arm 169 which extends below and rearwardly along the right support member 154 of the first structure 144.

The second hydraulic cylinder 168 is pivotally secured at its anchor end to a frame attached to the channels 14 of the chassis 12. Its rod end is pivotally secured to the free end of an arm 170 which is fixedly secured to the second structure 146 between its leg portions 160.

Figures 9, 10:
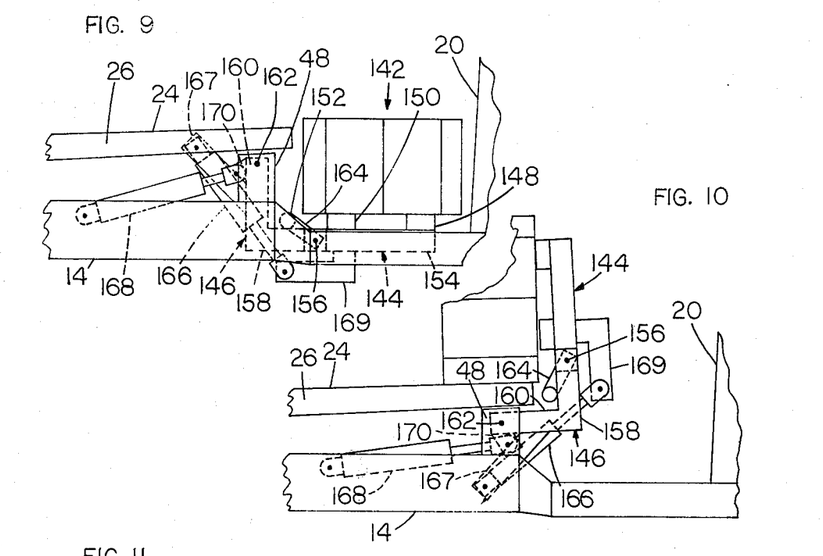
FIGS. 9 and 10 are schematic representations of the bale being delivered by an alternative form of the bale-receiving means on its edge side onto the front portion of the second table.

The first and second structures 144, 146 normally rest in a generally horizonal, bale-receiving position, as shown in FIG. 9, wherein the support members 154 and braces 164 of the first structure 144 and the short horizontal portions 158 of the second structure 146 extend alongside the channels 14 with the beams 148, 150, 152 of the first structure 144 upon the channels 14.

Figure 13:
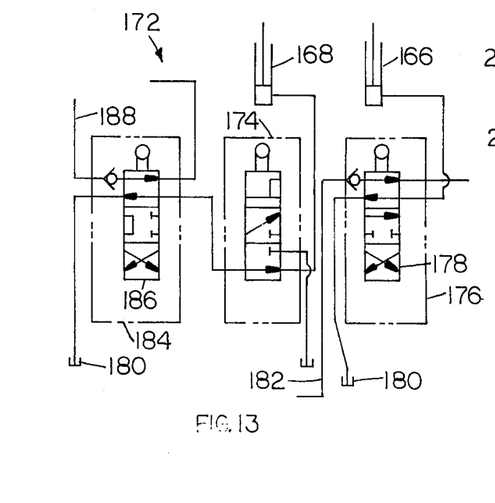
FIG. 13 is a schematic representation of the hydraulic circuit associated with the hydraulic cylinders for driving the alternative form of the bale-receiving means.

The means for selectively operating structures 144, 146 further includes hydraulic means, generally designated by numeral 172 in FIG. 13, for actuating the first and second hydraulic cylinders 166, 168 so as to operate the first and second structures 144, 146 of the alternative form of the improved first table 142 in either one of their two modes.

TWO MODES OF OPERATION OF ALTERNATIVE FORM OF IMPROVED FIRST TABLE

FIGS. 9 and 10 illustrate respective positions of the structures 144, 146, comprising the alternative form of the improved first table 142, at the start and end of a first of the two modes of operation of the structures 144, 146. The first mode generally simulates the single mode of operation of the first table as heretofore provided on the Grey bale wagon and involved actuation (full extension) of the second hydraulic cylinder 168, while the first hydraulic cylinder 166 is maintained in an initial partially extended condition, which allows the first and second structures 144, 146 to be pivotally moved to an upper, generally vertical, bale-discharging position, as seen in FIG. 10, as a unit and thereby lift the bale resting on one of its flat sides through an approximately 90 degree arcuate path and deposit it on the area 24 of the second table 26 on an adjacent edge side of the bale.

Figure 11:
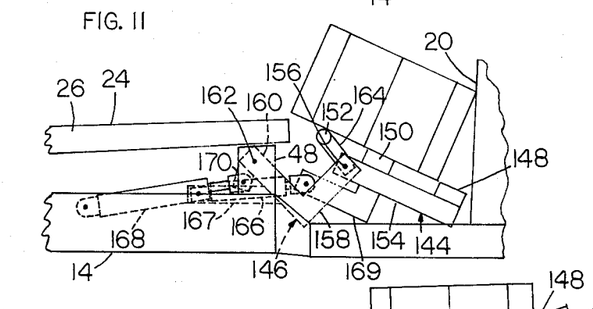
FIGS. 11 and 12 are schematic representations of the bale being delivered by the alternative form of the bale-receiving means on its flat side onto the front portion of the second table.
Figure 12:
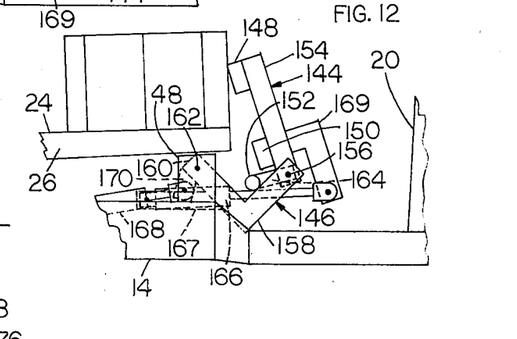

FIGS. 9, 11 and 12 illustrate the respective positions of the first and second structures 144, 146, comprising the alternative form of the improved first table 142, at the start, middle and end of a second of the two modes of operation of the first table structures 144, 146. In the second mode, initially the second hydraulic cylinder 168 is partially actuated (partially extended) to pivot the second structure 146 from its lower, horizontal position of FIG. 9 to an inclined position of FIG. 11. As the second structure 146 pivots, the first hydraulic cylinder 166 is allowed to freely retract from its partially extended condition of FIG. 9, which allows the first structure 144 to pivot toward its upper and rearwardly inclined position of FIG. 11. As the first structure 144 pivots, its rear beam 152 lifts a longitudinal portion of the bale located adjacent the second table 26 upwardly which pivots the bale in a clockwise manner forward until its upper forward longitudinal corner contacts the rear side of the cab 20 (or the vertical plate, not shown). After contact of the bale with the cab 20, further pivoting of the first structure 144 to its inclined position causes the bale to fulcrum about its upper forward longitudinal corner against the cab 20 and slide along the inclined plane defined by the top of beams 148, 150, 152 toward the second table 26 until its lower rear longitudinal corner is positioned slightly above the forward edge of the second table 26. Next, the second hydraulic cylinder 168 is maintained in the above-described partially extended condition, as seen in FIG. 11, and the first hydraulic cylinder 166 is actuated (fully extended) to pivot the first structure 144, relative to the second structure 146 about point 156, from its inclined position, as seen in FIG. 11, toward its upper vertical position of FIG. 12. As the first structure 144 pivots, its front beam 148 pushes on the front edge side of the bale and thereby moves the bale upwardly onto the area 24 of the second table 16, whereby the bale is deposited on the second table 26 on its same flat side.

Referring now to FIG. 13, there is shown the hydraulic means 172 for selectively actuating the first and second hydraulic cylinders 166, 168 so as to selectively operate the structures 144, 146 of the alternative form of the improved first table 142 in either one of their above-described two modes.

A first table delay valve 174 is associated with the hydraulic means 172 having a function identical to that described hereinbefore in connection with the preferred form of the improved first table, being designated 22.

The hydraulic means 172 includes a first valve 176 having a spool 178 being movable between upper, lower and centered positions. When the spool 178 is at its lower position, as shown in FIG. 13, the first hydraulic cylinder 166 is connected through to the tank 180, whereby the cylinder 166 is allowed to freely retract such as during the initial stage of the above-described second mode of operation of the structures 144, 146. When the spool 178 is at its upper position, the cylinder 166 is connected through to the pump (not shown) via line 182, whereby the cylinder 166 is actuated to extend such as during the final stage of the second mode of operation of the structures 144, 146. Finally, when the spool 178 is at its centered position, the cylinder 166 is maintained in the position it was immediately before the spool 178 was centered. Since centering of the spool 178 occurs when the first structure is in its lower, horizontal position, the cylinder 166 is maintained then in its partially extended position of FIGS. 9 and 10, such as during the first mode of operation of the structures 144, 146.

The hydraulic means 172 further includes a second valve 184 having a spool 186 being moveable between upper, lower and centered positions. When the spool 186 is at its lower position, as shown in FIG. 13, the second hydraulic cylinder 168 is connected through to the tank 180, whereby the second structure 146 is resting in its lower, horizontal position of FIG. 9. When the spool 186 is at its upper position, the cylinder 168 is connected through to the pump (not shown) via line 188, whereby the cylinder 168 is actuated to partially extend such as during the initial stage of the second mode of operation of the structures 144, 146, or to fully extend such as during the first mode of operation.

The spools 178, 186 of the first and second valves 178, 184 may be moved between their respective positions by any suitable arrangement, such as by appropriate movement of a control lever in the cab 20 by the bale wagon operator, which lever is connected to the valve spools 178, 186 by suitable mechanical linkage, in order to selectively actuate the hydraulic cylinders 166, 168 so as to selectively operate the structures 144, 146 of the alternative form of the improved first table 142 in either one of their above-described two modes.

It is thought that the invention and many of its attendant advantages will be understood from the foregoing description and it will be apparent that various changes may be made in the form, construction and arrangement of the parts of the bale wagon described without departing from the spirit and scope of the invention or sacrificing all of its material advantages, the forms hereinbefore described being merely exemplary embodiments thereof.

Having thus described the invention, what is claimed is:

1. In a bale wagon having a mobile chassis and means mounted on said chassis defining a bale-supporting area, the improvement which comprises:

means mounted on said chassis for receiving at least one bale on a first one of its sides adjacently along and generally below said bale-supporting area, said bale-receiving means being selectively operable in either one of two modes for moving said bale upwardly to respectively deposit said bale on said first one of its sides, or a second one of its sides adjacent to said first one side, on said bale-supporting area, said bale-receiving means being operable in a first one of said two modes to lift said bale upwardly through an arcuate path and deposit said bale on its second one side on said bale-supporting area, said bale-receiving means being operable in a second one of said two modes to initially lift said bale upwardly at its longitudinal portion located near said bale-supporting area and thereby dispose said bale in a tilted position with its first one side directed upwardly toward said bale-supporting area and then to push said tilted bale upwardly toward said bale- supporting area and deposit said bale on its first one side on said bale-supporting area.

2. A bale wagon as recited in claim 1, further comprising:

means provided on said chassis along a side of said bale- receiving means located remote from said bale-supporting area for engaging said bale as said bale is lifted to its tilted position by said bale-receiving means to thereby limit movement of said bale away from said bale-supporting area.

3. In a bale wagon having a mobile chassis, means mounted on said chassis for picking up bales and means mounted on said chassis defining a bale-supporting area, the improvement which comprises:

means mounted on said chassis adjacently along and below said bale-supporting area and adjacent and transverse to said bale-picking up means for receiving at least one bale on a first one of its sides from said latter means adjacently along and generally below said bale-supporting area, said bale-receiving means being selectively operable in either one of two modes for moving said bale upwardly to respectively deposit said bale on said first one of its sides, or a second one of its sides adjacent to said first one side, on said bale-supporting area.

4. A bale wagon as recited in claim 3, wherein said bale-recieving means includes:

first structure for supporting said bale along its first one side at a location remote from said bale-supporting area;

second structure for supporting said bale along its first one side at a location near said bale-supporting area, said first and second structures being operable in either one of said two modes for moving said bale upwardly.

5. A bale wagon as recited in claim 5, wherein said bale-receiving further includes:

means for selectively operating said first and second structures in either one of said two modes.

6. A bale wagon as recited in claim 5, wherein:
said first structure is mounted to said chassis for pivotal movement between lower and upper positions toward and away from said bale-supporting area;
said second structure is mounted to said chassis for pivotal movement between lower and upper positions toward and away from said bale-supporting area; and
said means for selectively operating said first and second structures includes a first actuatable driving component pivotally coupled between said chassis and said first structure for pivotally moving said first structure from its lower to its upper position toward said bale- supporting area, a second actuatable driving component pivotally coupled between said chassis and said second structure for pivotally moving said second structure from its lower to its upper position toward said bale- supporting surface, and means for actuating said first and second driving components so as to operate said first and second structures in either one of said two modes.

7. A bale wagon as recited in claim 6, wherein said second structure overlaps a portion of said first structure,
whereby initial actuation of said first driving component by said actuating means will pivotally move both said first structure and said second structure as a unit in a first one of said two operative modes from their respective lower to upper positions toward said bale-supporting area and thereby lift said bale upwardly and deposit said bale on its second one side on said bale-supporting area, while initial actuation of said second driving component by said actuating means will pivotally move said second structure in a second one of said two operative modes from its lower to upper position and thereby lift said portion of said bale located adjacent said bale-supporting area upwardly and tilt said first one side of said bale upwardly toward said bale-supporting area and subsequent actuation of said first driving component by said actuating means will pivotally move said first structure in said second one of said operative modes from its lower to its upper position and thereby push said bale upwardly toward said bale-supporting area and deposit said bale on its first one side on said bale-supporting area.

8. A bale wagon as recited in claim 3, wherein said bale-receiving means includes:
first structure for supporting said bale along its first one side; and
second structure for supporting said first structure, said first and second structures being operable in either one of said two modes for moving said bale upwardly.

9. A bale wagon as recited in claim 8, wherein said bale-receiving means further includes:
means for selectively operating said first and second structures in either one of said two modes.

10. A bale wagon as recited in claim 9, wherein:
said first structure is mounted to said second structure for pivotal movement between lower and upper positions toward and away from said bale- supporting area;
said second structure is mounted to said chassis for pivotal movement between lower and upper positions toward and away from said bale- supporting area; and
said means for selectively operating said first and second structures includes a first actuatable driving component pivotally coupled between said first structure and said second structure for maintaining said first structure in a fixed relationship to said second structure in a first one of said two operative modes and for pivotally moving said first structure relative to said second structure and between its lower and upper positions in a second one of said two operative modes, a second actuatable driving component pivotally coupled between said chassis and said second structure for pivotally moving said second structure from its lower to its upper position toward said bale-supporting area in said first one of said two operative modes and for pivotally moving said second structure to, and holding it at, an intermediate position between its lower and upper positions in said second one of said two operating modes, and means for actuating said first and second driving components so as to operate said first and second structures in either one of said two modes.

11. In a bale wagon, the combination comprising:
a mobile chassis;
a first table mounted on said chassis;
a second table mounted on said chassis rearwardly of and above said first table; and
means for loading at least one bale and placing it on the first table resting on a first one of its sides adjacently along and generally below said second table;
said first table including first structure for supporting said bale along its first one side at a location remote from said second table and being mounted for pivotal movement between lower and upper positions toward and away from said second table, and second structure for supporting said bale along its first one side at a location near said second table and being mounted for pivotal movement between lower and upper positions toward and away from said second table,
whereby pivotal movement of said second structure from its lower to upper position lifts said portion of said bale located adjacent said second table upwardly and forwardly so as to incline said first one side of said bale upwardly and rearwardly toward said second table and subsequent pivotal movement of said first structure from its lower to upper position pushes said bale upwardly toward said second table so as to deposit said bale on its first one side on said second table.

12. A bale wagon as recited in claim 11, further comprising:
a first actuatable driving component pivotally coupled between said chassis and said first structure for pivotally moving said first structure from its lower to its upper position toward said second table; and
a second actuatable driving component pivotally coupled between said chassis and said second structure for pivotally moving said second structure from its lower to its upper position toward said second table.

13. A bale wagon as recited in claim 12, further comprising:
actuating means for initially actuating said second driving component to pivotally move said second structure from its lower to upper position and for subsequently actuating said first driving component to pivotally move said first structure from its lower to upper position while said second structure is maintained at its upper position.

14. In a bale wagon, the combination comprising:

a mobile chassis;

a first table mounted on said chassis;

a second table mounted on said chassis rearwardly of and above said first table;

means for loading at least one bale and placing it on the first table resting on a first one of its sides adjacently along and generally below said second table;

said first table including first structure for supporting said bale along its first one side and second structure for supporting said first structure and being mounted to said chassis for pivotal movement between lower and inclined positions toward and away from said second table, said first structure being mounted to said second structure for pivotal between lower and upper positions toward and away from said second table;

a first actuatable driving component pivotally coupled between said first structure and said second structure for pivotally moving said first structure relative to said second structure; and a second actuatable driving component pivotally coupled between said chassis and said second structure for pivotally moving said second structure relative to said chassis and thereby said first structure relative to said second structure, whereby initial actuation of said second driving component will pivotally move said second structure from its lower to its inclined position and cause said first structure to pivotally move from its lower position to an intermediate inclined position so as to incline said first one side of said bale upwardly and rearwardly toward said second table and subsequent actuation of said first driving component will pivotally move said first structure from its intermediate position to its upper position, as said second driving component maintains said second structure in its inclined position, so as to push said bale upwardly toward said second table and deposit said bale on its first one side on said second table.

* * * * *

UNITED STATES PATENT OFFICE
CERTIFICATE OF CORRECTION

Patent No. 3,923,176            Dated December 2, 1975

Inventor(s) Edward J. Wynn and Lee D. Butler

It is certified that error appears in the above-identified patent and that said Letters Patent are hereby corrected as shown below:

In the Abstract, line 5, delete "of" and insert --or--.

Column 2, line 10, delete "flat" and insert --"flat"--.

Column 8, line 40, delete "supporttines" and insert --suport tines--.

Column 9, line 31, delete "the" first occurrence and insert --The--.

Column 10, line 41, after "90°" insert --arcuate--.

Column 14, line 2, after "frame" insert --member--.

line 31, delete "involved" and insert --involves--.

Column 15, line 9, delete "16" and insert --26--.

line 57, delete "178" and insert --176--.

Column 16, line 57, delete "recieving" and insert --receiving--.

line 66, delete "5" and insert --4--.

Signed and Sealed this eleventh Day of May 1976

[SEAL]

Attest:

RUTH C. MASON            C. MARSHALL DANN
*Attesting Officer*         *Commissioner of Patents and Trademarks*

Dedication 3,923,176.—*Edward J. Wynn*, Freson, and *Lee D. Butler*, Kingsburg, Calif. FIRST TABLE FOR A BALE WAGON. Patent dated Dec. 2, 1975. Dedication filed July 3, 1978, by the assignee, *Sperry Rand Corporation*.

Hereby dedicates to the Public the entire remaining term of said patent.
[*Official Gazette August 29, 1978.*]